US012618726B2

(12) United States Patent
Kim et al.

(10) Patent No.: US 12,618,726 B2
(45) Date of Patent: May 5, 2026

(54) STRAIN-INSENSITIVE TACTILE SENSOR WITH HIGH SENSITIVITY AND WIDE SENSING RANGE USING STRETCHABLE SENSOR ARRAY

(71) Applicant: Industry-Academic Cooperation Foundation, Yonsei University, Seoul (KR)

(72) Inventors: Jongbaeg Kim, Gyeonggi-do (KR); Minhyeong Kim, Gyeongsangbuk-do (KR); Kyubin Bae, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 644 days.

(21) Appl. No.: 18/150,997

(22) Filed: Jan. 6, 2023

(65) Prior Publication Data
US 2023/0213396 A1 Jul. 6, 2023

(30) Foreign Application Priority Data
Jan. 6, 2022 (KR) ........................ 10-2022-0002026

(51) Int. Cl.
*G01L 1/22* (2006.01)
(52) U.S. Cl.
CPC .................................. *G01L 1/2287* (2013.01)
(58) Field of Classification Search
None
See application file for complete search history.

(56) References Cited

U.S. PATENT DOCUMENTS

| | | | |
|---|---|---|---|
| 4,644,101 A | 2/1987 | Jin et al. | |
| 10,860,129 B2* | 12/2020 | Lim | ................. H01L 21/02617 |
| 2018/0300006 A1 | 10/2018 | Lim et al. | |

FOREIGN PATENT DOCUMENTS

| | | |
|---|---|---|
| JP | H0820320 B2 | 3/1996 |
| KR | 10-2010-0122002 A | 11/2010 |
| KR | 10-2018-0116517 A | 10/2018 |

(Continued)

OTHER PUBLICATIONS

Kyubin Bae et al, "Large-Area, Crosstalk-Free, Flexible Tactile Sensor Matrix Pixelated by Mesh Layers", ACS Applied Materials & Interfaces, vol. 13, the No. 10, the pp. 12259~12267, Mar. 17, 2021 (Year: 2021).*

(Continued)

*Primary Examiner* — Eric S. McCall
*Assistant Examiner* — Nigel H Plumb
(74) *Attorney, Agent, or Firm* — DICKINSON WRIGHT PLLC

(57) ABSTRACT
Provided is a tension-insensitive tactile sensor having high sensitivity and a wide sensing range by using a stretchable sensor array. According to the stretchable sensor array and the method for manufacturing the same of the present invention, pressure may be measured without interference of tension while maintaining flexibility of the sensor. In addition, the stretchable sensor array may have high initial resistance, induce a large change in contact resistance when pressure is applied, thereby being capable of measuring pressure with high sensitivity, have a wide pressure sensing range, and have decreased interference by an when sensing a pressure distribution.

10 Claims, 3 Drawing Sheets

(56)　　　　　　References Cited

FOREIGN PATENT DOCUMENTS

| KR | 10-1976024 | B1 | 5/2019 |
| KR | 10-2019-0105428 | A | 9/2019 |
| KR | 10-2020-0020429 | A | 2/2020 |

OTHER PUBLICATIONS

Kyubin Bae, et al., "Large-Area, Crosstalk-Free, Flexible Tactile Sensor Matrix Pixelated by Mesh Layers", ACS Applied Materials & Interfaces, vol. 13, No. 10, pp. 12259-12267, Mar. 17, 2021.
Office Action of KR 10-2022-0002026 mailed Aug. 25, 2023, with English machine translation.
Lee, Eunji, et al., "Direct Patterning of a Carbon Nanotube Thin Layer on a Stretchable Substrate", Micromachines 2019, 10, 530; DOI: 10.3390/mi10080530; pp. 1-14.
Tegtmeier, K., et al., "Wet-etch induced changes in impedance of carbon nanotube—silicone rubber electrode materials for active implants", Elsevier, Procedia Engineering 168 (2016); DOI: 10.1016/j.proeng.2016.11.393; pp. 1168-1171.
Lee, Eunji, et al., "Supplementary Materials: Direct Patterning of a Carbon Nanotube Thin Layer on a Stretchable Substrate", Micromachines 2019, 10, 530; DOI: 10.3390/mi10080530, pp. 1-4.

* cited by examiner

STRAIN-INSENSITIVE TACTILE SENSOR WITH HIGH SENSITIVITY AND WIDE SENSING RANGE USING STRETCHABLE SENSOR ARRAY

CROSS-REFERENCE TO RELATED APPLICATIONS

This application claims priority to and the benefit of Korean Patent Application No. 10-2022-0002026, filed on Jan. 6, 2022, in the Korean Intellectual Property Office, the disclosure of which is incorporated herein by reference in its entirety.

TECHNICAL FIELD

The following disclosure relates to a tactile sensor which has high sensitivity and a wide sensing range and is insensitive to tension by using a stretchable sensor array.

BACKGROUND

The statements in this section merely provide background information related to the present disclosure and may not constitute prior art.

Human skin is a complex sensory perception organ interacting with an external environment, and in order to imitate this, a tactile sensor which imitates tactility for perceiving an external physical stimulus is being developed. A tactile sensor responds to physical stimuli such as pressure, tension, and bending, and converts a physical stimulus signal into an electrical or digital signal and perceives the signal.

Since the tactile sensor has different element structures depending on the kinds of converted electrical signals and application fields to be applied, it may be implemented in various shapes, and for example, when it is used in a wearable sensor, flexibility and softness are required, and when it is used in a terminal, miniaturization, light weight, and the like are required.

A tactile sensor developed so far includes a resistive type, a capacitive type, an infrared proximity type, a piezoelectric type, and the like. Since among them, a stretchable tactile sensor may easily measure pressure through a resistance method due to its simple structure, many studies have been conducted, and in particular, studies to increase sensitivity are receiving a lot of attention.

However, since the tactile sensor as such has problems such as low sensitivity, a limited pressure measurement range, and non-uniform sensor characteristics, development of a flexible tactile sensor which has low hysteresis, uniform sensor characteristics, a large pressure measurement range, and high sensitivity as compared with the conventional tactile sensor is demanded.

SUMMARY

An embodiment of the present invention is directed to providing a stretchable sensor array which may measure pressure without interference of tension while maintaining flexibility of a sensor.

Another embodiment of the present invention is directed to providing a stretchable sensor array which has high initial resistance and induces a large change in contact resistance when pressure is applied, thereby being capable of measuring pressure with high sensitivity.

Another embodiment of the present invention is directed to providing a stretchable sensor array which has a wide pressure sensing range and also has decreased interference by an adjacent cell when sensing a pressure distribution.

Still another embodiment of the present invention is directed to provide a method for manufacturing a flexible stretchable sensor array having a large area easily and rapidly.

In one general aspect, a stretchable sensor array includes: a polymer matrix including a first elastomer and having a plurality of holes; and a plurality of cells which are filled into the plurality of holes and include a convex portion protruding outward on one or more surfaces of the polymer matrix, wherein the plurality of cells includes a conductive composite including conductive particles and a second elastomer.

In the stretchable array of the present invention, the convex portion protruding on the surface of the polymer matrix may have a height of 0.1 to 1 mm.

In the stretchable array of the present invention, the cell may have a decreased thickness with compression.

In the stretchable array of the present invention, the first elastomer and the second elastomer may be a silicon-based elastomer.

In the stretchable array of the present invention, the conductive particles may be a conductive carbonaceous material, and the conductive carbonaceous material may be a carbon nanotube.

In the stretchable array of the present invention, the conductive particles may be included at 0.1 to 15 wt % with respect to the conductive composite, and the Young's modulus of the conductive composite may be higher than the Young's modulus of the first elastomer.

In the stretchable array of the present invention, the stretchable sensor array senses pressure to generate an electrical signal.

In another general aspect, a tactile sensor includes: an upper electrode; a stretchable sensor array of claim 1 in electrical contact with the upper electrode; and a lower electrode in electrical contact with the stretchable sensor array.

In the tactile sensor of the present invention, the tactile sensor may have a sensitivity $(S=(\Delta l/l_0)/\Delta p)$ of 0.8 kPa$^{-1}$ or more.

In still another general aspect, a method for manufacturing a stretchable sensor array includes: (a) stretching a polymer matrix including a first elastomer and having a plurality of holes; (b) filling the plurality of holes with a dispersion including conductive particles and a second elastomer; (c) removing tension in the polymer matrix; and (d) curing the dispersion to form a plurality of cells.

In the method for manufacturing a stretchable sensor array of the present invention, after the step (d), (e) etching the polymer matrix may be further included, the etching step of (e) may use a solution including an ammonium fluoride-based compound and a polar aprotic solvent, the polar aprotic solvent may be an amide-based solvent, and the ammonium fluoride-based compound and the polar aprotic solvent may be mixed at a volume ratio of 1:2 to 1:5.

Other features and aspects will be apparent from the following detailed description, the drawings, and the claims.

BRIEF DESCRIPTION OF THE DRAWINGS

In order that the disclosure may be well understood, there will not be described various forms thereof, given by example, reference being made to the accompanying drawings, in which.

DETAILED DESCRIPTION

Figure 1:
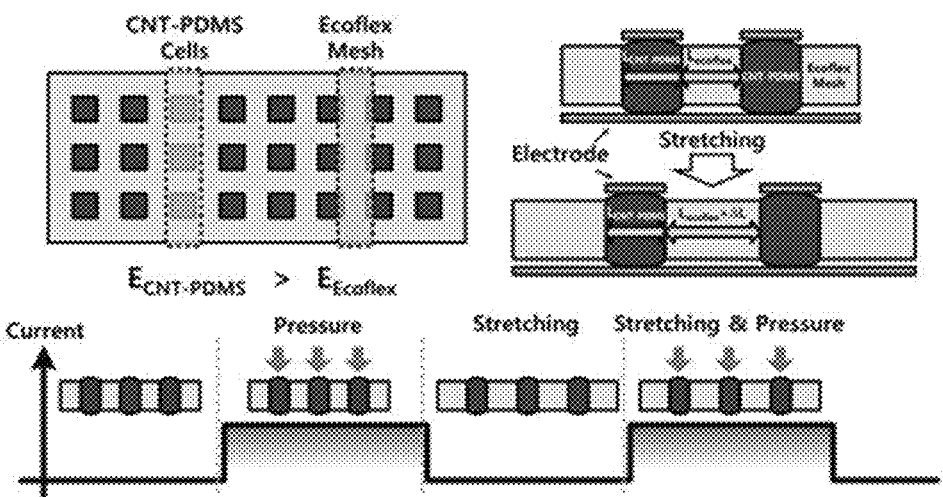
FIG. 1 is a schematic diagram showing an operation principle of a stretchable sensor array manufactured according to the present invention.

Hereinafter, referring to accompanying drawings, a stretchable sensor array, a method for manufacturing the same, and a tactile sensor including the same of the present invention will be described in detail.

The drawings to be provided below are provided by way of example so that the spirit of the present invention can be sufficiently transferred to a person skilled in the art to which the present invention pertains. Therefore, the present invention is not limited to the drawings provided below but may be embodied in many different forms, and the drawings suggested below may be exaggerated in order to clear the spirit of the present invention.

Technical terms and scientific terms used herein have the general meaning understood by those skilled in the art to which the present invention pertains, unless otherwise defined, and the description for the known function and configuration which may unnecessarily obscure the gist of the present invention will be omitted in the following description and the accompanying drawings.

In addition, the singular form used in the specification and claims appended thereto may be intended to include a plural form also, unless otherwise indicated in the context.

In the present specification and the appended claims, the terms such as "first" and "second" are not used in a limited meaning but are used for the purpose of distinguishing one constituent element from other constituent elements.

In the present specification and the appended claims, the terms such as "comprise" or "have" mean that there is a characteristic or a constituent element described in the specification, and as long as it is not particularly limited, a possibility of adding one or more other characteristics or constituent elements is not excluded in advance.

In the present specification and the appended claims, when a portion such as a membrane (layer), a region, and a constituent element is present on another portion, not only a case in which the portion is in contact with and directly on another portion but also a case in which other membranes (layers), other regions, other constitutional elements are interposed between the portions is included.

The stretchable sensor array according to the present invention is characterized by including: a polymer matrix including a first elastomer and having a plurality of holes; and a plurality of cells which are filled into the plurality of holes and include a convex portion protruding outward on one or more surfaces of the polymer matrix, wherein the plurality of cells includes a conductive composite including conductive particles and a second elastomer.

In a specific example, the plurality of cells may have a shape including a convex portion protruding outward on one or more surfaces of the polymer matrix. Due to the shape as such, the stretchable sensor array has high initial resistance, and induces a large change in contact resistance when pressure is applied, thereby being capable of measuring pressure with high sensitivity. In addition, when pressure is measured by the stretchable sensor array, low pressure may be sensed by a change in a contact area between a conductive composite and an electrode, high pressure may be measured by the piezoresistive effect of the conductive composite, and thus, the stretchable sensor array may have a large area sensing range and be used in various application fields.

In a specific example, the convex portion protruding on the surface of the polymer matrix may have a height of 0.1 to 1 mm, preferably 0.1 to 0.4 mm, and more preferably 0.2 to 0.3 mm. Since the cell is compressed, the height of the convex portion protruding on the surface of the polymer matrix may be decreased, and thus, the contact area of the cell may be increased. In addition, since the polymer matrix has stretchability, as the cell is compressed, the thickness of the polymer matrix is decreased and tension is applied in a width direction, so that the width in a surface direction may be increased.

In a specific example, an average diameter of each of the plurality of cells may be 100 to 2,000 μm, preferably 300 to 1,800 μm, and more preferably 500 to 1,500 μm. In addition, spacing between the plurality of cells may be 100 to 1,000 μm, preferably 150 to 800 μm, and more preferably 200 to 600 μm.

Since the height of the convex portion protruding outward, the average diameter of the cells, and the spacing between the cells on the surface of the polymer matrix in the above range are satisfied, each cell is separated to remove electrical crosstalk, thereby decreasing interference by an adjacent cell when sensing a pressure distribution to manufacture a sensor having a structure without electrical connection between cells, and thus, the stretchable sensor array has high sensing sensitivity even under low pressure and may sense pressure in a large pressure range from low pressure to high pressure.

In a specific example, the first elastomer and the second elastomer may be a polymer material showing elasticity near room temperature, and when a force is applied to the polymer material, the material is stretched to hundreds of percent of its original length, and when the force is removed, it returns to its almost original length within a short time.

As the first elastomer and the second elastomer, a silicon-based elastomer may be used. The silicon-based elastomer may be polydialkylsiloxane, and as a non-limiting example, may be a material selected from the group consisting of polydimethylsiloxane (PDMS), Ecoflex®, and Dragon Skin®. Preferably, Ecoflex® may be used as the first elastomer and PDMS may be used as the second elastomer, and the use of the silicon-based elastomer is advantageous for sensing implementation in a wide tensile range.

In a specific example, the conductive particles are not limited as long as they have conductivity, but may be preferably a conductive carbonaceous material.

The conductive carbonaceous material may include a conductive one-dimensional carbonaceous material or a conductive two-dimensional carbonaceous material. More specifically, the conductive one-dimensional carbonaceous material may be any one or a combination of two or more selected from the group consisting of carbon nanotube (CNT), graphene nanoribbon (GNR), carbon nanofiber, and carbon nanowire, the carbon nanotube may be single-wall carbon nanotube (SWNT) or multi-wall carbon nanotube (MWNT), and preferably, multi-wall carbon nanotube may be used as the conductive one-dimensional carbonaceous material. The multi-wall carbon nanotube has better mechanical strength, better structure maintenance following tensile repetition, and a wider tensile range than a carbon nanotube such as a single-wall carbon nanotube, and thus, is advantageous for use in a sensor composite.

The conductive one-dimensional carbonaceous material may have a diameter of 10 to 200 nm, preferably 20 to 150 nm and a length of 10 to 100 μm, preferably 20 to 80 μm, but is not limited thereto.

In addition, the two-dimensional carbonaceous material may be any one or a combination of two or more selected from the group consisting of graphene, graphene oxide (GO), and reduced graphene oxide (rGO).

In a specific example, the conductive particles may be characterized by being uniformly dispersed in the second elastomer. More specifically, the conductive particles may be included at 0.1 to 15 wt %, preferably 0.5 to 10 wt %, and more preferably 2 to 8 wt % with respect to the conductive composite. According to the content of the conductive particles in the above range, the conductive composite which is a pressure-sensitive material has an advantage of being hardly deformed in a horizontal direction and inducing high initial resistance when pressure is applied, thereby showing high sensitivity, as compared with the second elastomer.

In a specific example, the stretchable sensor array is divided into a conductive composite having a relatively high Young's modulus and a polymer matrix part including the first elastomer which has a relatively low Young's modulus to be easily stretched. Thus, when the sensor is stretched, a polymer matrix structure is responsible for most deformation, and the conductive composite which is a pressure-sensitive material is hardly deformed. Due to the structure, the manufactured sensor maintains flexibility and also is insensitive to tension.

That is, by using elastic polymers having different Young's modulus, the structure of an elastomer having a lower Young's modulus is mostly deformed, and a conductive composite part having a higher Young's modulus is hardly deformed, thereby decreasing the effect of tension. The operation principle of the stretchable sensor array is shown in FIG. 1.

In a specific example, the stretchable sensor array may sense pressure to generate an electrical signal. The principle of the stretchable sensor array is that when pressure is applied to a cell filled into a plurality of holes of the polymer matrix, the shape of the cell is deformed, so that an electrical contact may be generated between different conductive particles exposed to the surface of the cell. When pressure is applied, the shape of the cells filled into the plurality of holes of the stretchable sensor array is deformed, and an electrical contact is generated between conductive particles protruding and being exposed on the surface of the cell, and thus, a relatively high current flows as compared with the case with no external pressure.

The tactile sensor according to the present invention is characterized by including: an upper electrode; a stretchable sensor array in electrical contact with the upper electrode; and a lower electrode in electrical contact with the stretchable sensor array.

The upper electrode and the lower electrode may be used without limitation as long as they are known electrodes, but specifically, may be a material made of a metal, a conductive polymer, or the like, and preferably, may be a flexible metal material or a flexible conductive polymer material. Specifically, the electrode made of metal may be selected from metal materials including aluminum (Al), copper (Cu), titanium (Ti), or tungsten (W), or an alloy thereof, but is not limited as long as it is a metal made of a conductive material.

The tactile sensor may have a sensible pressure range from as little as 0 kPa up to 4,000 kPa or more, and a coefficient of determination $R^2$ of 0.98 or more to a change in pressure applied in a vertical direction to the surface of the electrode. More specifically, the tactile sensor may have a coefficient of determination of $R^2$ of 0.98 or more, preferably 0.99 or more to have excellent linearity, thereby having uniform response characteristics in the pressure range and sensing characteristics of improved accuracy of a pressure sensor. In addition, the tactile sensor may have sensitivity (S) of 0.8 $kPa^{-1}$ or more, preferably 1.6 $kPa^{-1}$ or more, and more preferably 2.4 $kPa^{-1}$ or more. This is significantly improved as compared with the sensitivity of a traditional pressure sensor of $5 \times 10^{-3}$ to 0.55 $kPa^{-1}$.

The sensitivity (S) is a slope of a curve and defined as $S=(\Delta l/l_0)/\Delta p$ in which $\Delta p$ is a change in applied pressure, $\Delta l$ and $l_0$ are a relative change in current and a current with no applied pressure, respectively.

Figure 2:
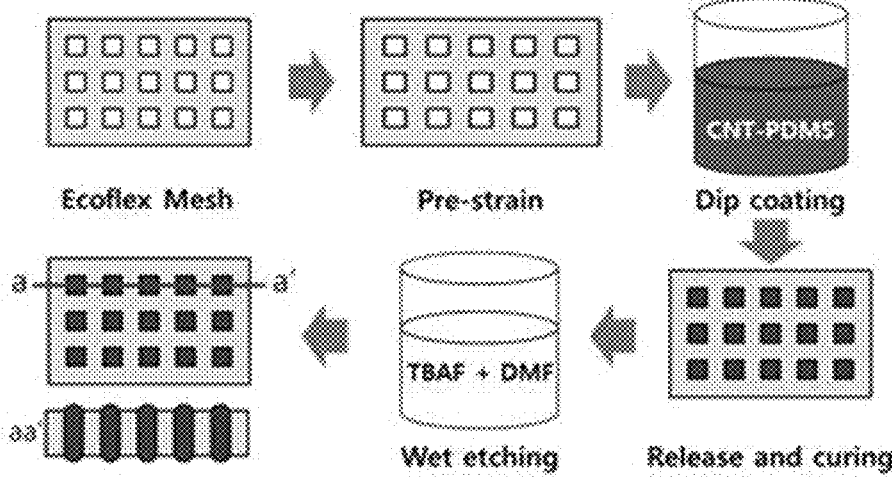
FIG. 2 is a schematic diagram showing a manufacturing process of the stretchable sensor array of the present invention.

The method for manufacturing a stretchable sensor array according to the present invention is characterized by including: (a) stretching a polymer matrix including a first elastomer and having a plurality of holes; (b) filling the plurality of holes with a dispersion including conductive particles and a second elastomer; (c) removing tension in the polymer matrix; and (d) curing the dispersion to form a plurality of cells. A specific manufacturing method is shown in FIG. 2.

In a specific example, in the step (b), conductive particles and a second elastomer may be dispersed in an organic solvent to prepare a dispersion.

The organic solvent is not limited as long as the conductive particles and the second elastomer are soluble in the solvent, but specifically, may be aliphatic hydrocarbons, for example, ethers such as tetrahydrofuran and 1,3-dioxolane; alcohols such as methanol, ethanol, and isopropylalcohol; ketones such as acetone and N-methylpyrrolidone; glycol ethers such as ethylene glycol monoethyl ether, ethylene glycol monobutyl ether, propylene glycol monomethyl ether (PGME), and propylene glycol monoethyl ether; deionized water, toluene, xylene, chloroform, and the like, preferably chloroform.

In the step of mixing the second elastomer with the solution in which the conductive particles are dispersed, the second elastomer may be a first embodiment including a liquid prepolymer of the second elastomer and a crosslinking agent (curing agent), a second embodiment further including an organic solvent in the first embodiment, or a third embodiment which is a polymer solution in which a solid second elastomer is dissolved in an organic solvent.

The liquid prepolymer of the second elastomer is a polymer containing a curable functional group, and is not particularly limited as long as it has flexibility after curing, but specifically, may be selected from a silicon-based prepolymer, an olefin-based elastic prepolymer, a urethane-based prepolymer, and the like.

The silicon-based prepolymer may be divided into a condensation type and an addition type. The condensation type silicon-based prepolymer may cause crosslinking curing by hydrolysis and a condensation reaction in the presence of moisture, and the addition type silicon-based prepolymer may cause crosslinking curing by an addition reaction between an unsaturated group of the silicon-based prepolymer and a crosslinking agent in the presence of a catalyst.

More specifically, the condensation type silicon-based prepolymer may be a siloxane-based prepolymer containing a silanol group as an end group, and may form a polymer by a hydrolysis condensation reaction between a silanol group and a crosslinking agent and a condensation reaction by a catalyst and moisture. The condensation type silicon-based prepolymer may be aliphatic polysiloxane or aromatic polysiloxane having two or more hydroxyl groups, or polysiloxane including a siloxane repeating unit including both an aliphatic group or an aromatic group in one repeating unit or independently including each of the groups. 2 to 20 hydroxyl groups may be included in one polysiloxane chain, but it is not limited thereto, and as a molecular weight of polysiloxane increases, the number of hydroxyl group may be increased to 20 or more proportionally, and polysiloxane having a low molecular weight included may include 2 to 4 hydroxyl groups. A non-limiting example of aliphatic polysiloxane may be polydimethylsiloxane, polydiethylsiloxane, polymethylethylsiloxane, polydimethylsiloxane-co-diethylsiloxane, polydimethylsiloxane-co-ethylmethylsiloxane, and the like, and a non-limiting example of aromatic polysiloxane may be polydiphenylsiloxane, polymethylphenylsiloxane, polyethylphenylsiloxane, poly(dimethylsiloxane-co-diphenylsiloxane), and the like. The polysiloxane including a siloxane repeating unit including both an aliphatic group and an aromatic group in one repeating unit or independently including each of the groups includes all of the repeating units of the aliphatic polysiloxane and the repeating units of the aromatic polysiloxane exemplified above, or refers to a form in which the aliphatic substituent exemplified above and the aromatic substituent exemplified above are bonded to a silicon element positioned in one repeating unit, respectively, but is not limited thereto.

Here, the crosslinking agent may be a siloxane-based curing agent containing a Si—O bond, an organosilazane curing agent containing a Si—N bond, or the like, and as an example, $(CH_3)Si(X)_3$ or $Si(OR)_4$. Here, X may be methoxy, acetoxy, oxime, an amine group, and the like, R is a lower alkyl group, and as a non-limiting specific example, a methyl, an ethyl, or a propyl group.

The catalyst is not limited as long as it is commonly used in the art, and as a non-limiting specific example, may be an organotin compound, an organotitanium compound, an amine-based compound, or the like.

The addition type silicon-based prepolymer may be a siloxane-based prepolymer containing an ethylenic unsaturated group, and more specifically, a siloxane-based prepolymer containing a vinyl group. Accordingly, a siloxane-based prepolymer containing a vinyl group and a siloxane-based compound containing a Si—H bond (crosslinking agent) undergo an addition reaction to crosslink a siloxane chain, thereby forming a polymer. The addition type silicon-based prepolymer may be aliphatic polysiloxane or aromatic polysiloxane having two or more vinyl groups, or polysiloxane including a siloxane repeating unit including both an aliphatic group or an aromatic group in one repeating unit or independently including each of the groups. 2 to 20 vinyl groups may be included in one polysiloxane chain, but it is not limited thereto, and as a molecular weight of polysiloxane increases, the number of vinyl group may be increased to 20 or more proportionally, and polysiloxane having a low molecular weight may include 2 to 4 vinyl groups. A non-limiting example of aliphatic polysiloxane may be polydimethylsiloxane, polydiethylsiloxane, polymethylethylsiloxane, polydimethylsiloxane-co-diethylsiloxane, polydimethylsiloxane-co-ethylmethylsiloxane, and the like, and a non-limiting example of aromatic polysiloxane may be polydiphenylsiloxane, polymethylphenylsiloxane, polyethylphenylsiloxane, poly(dimethylsiloxane-co-diphenylsiloxane), and the like. The polysiloxane including a siloxane repeating unit including both an aliphatic group and an aromatic group in one repeating unit or independently including each of the groups includes all of the repeating units of the aliphatic polysiloxane and the repeating units of the aromatic polysiloxane exemplified above, or refers to a form in which the aliphatic substituent exemplified above and the aromatic substituent exemplified above are bonded to a silicon element positioned in one repeating unit, respectively, but is not limited thereto.

The crosslinking agent is not particularly limited as long as it is a siloxane-based compound containing a Si—H bond, and as a specific example, may be aliphatic or aromatic polysiloxane containing a —(RaHSiO)— group. Ra may be an aliphatic or an aromatic group, and may be a methyl group, an ethyl group, or a propyl group as the aliphatic group, and a phenyl group or a naphthyl group as the aromatic group, and the substituent may be substituted with other substituents in a range which does not affect the crosslinking reaction or not substituted, but is not limited thereto. As a non-limiting example, it may be polymethylhydrogensiloxane $[(CH_3)_3SiO(CH_3HSiO)_xSi(CH_3)_3]$, polydimethylsiloxane $[(CH_3)_2HSiO((CH_3)_2SiO)_xSi(CH_3)_2H]$, polyphenylhydrogensiloxane $[(CH_3)_3SiO(PhHSiO)_xSi(CH_3)_3]$, polydiphenylsiloxane $[(CH_3)_2HSiO((Ph)_2SiO)_xSi(CH_3)_2H]$, or the like, and herein, it is preferred to adjust the content of Si—H depending on the number of vinyl groups contained in the addition type silicon-based prepolymer, and as an example, x may be 1 or more, more preferably 2 to 10, but is not limited thereto.

Here, a catalyst may be optionally added for acceleration of the reaction and is not limited as long as it is commonly used in the art, and as a specific example, may be a platinum compound and the like.

The second elastomer of the second embodiment may include the liquid second elastomer prepolymer at a concentration of 0.1 mg/ml to 20 mg/ml, specifically at a concentration of 1 mg/ml to 10 mg/ml with respect to the organic solvent, but is not limited thereto.

The organic solvent is not limited as long as the second elastomer prepolymer is soluble in the solvent, but specifically, may be aliphatic hydrocarbons, for example, ethers such as tetrahydrofuran and 1,3-dioxolane; alcohols such as methanol, ethanol, and isopropylalcohol; ketones such as acetone and N-methylpyrrolidone; glycol ethers such as ethylene glycol monoethyl ether, ethylene glycol monobutyl ether, propylene glycol monomethyl ether (PGME), and propylene glycol monoethyl ether; deionized water, toluene, xylene, chloroform, and the like, preferably chloroform, but is not limited thereto.

The second elastomer solution of the third embodiment which is a polymer solution in which the solid second elastomer is dissolved in the organic solvent may include the second elastomer at a concentration of 1 mg/ml to 100 mg/ml in the polymer solution, but is not limited thereto.

The organic solvent is not limited as long as the second elastomer prepolymer is soluble in the solvent, but specifically, may be aliphatic hydrocarbons, for example, ethers such as tetrahydrofuran and 1,3-dioxolane; alcohols such as methanol, ethanol, and isopropylalcohol; ketones such as acetone and N-methylpyrrolidone; glycol ethers such as ethylene glycol monoethyl ether, ethylene glycol monobutyl ether, propylene glycol monomethyl ether (PGME), and propylene glycol monoethyl ether; deionized water, toluene, xylene, chloroform, and the like, preferably chloroform, but is not limited thereto.

A viscosity of the second elastomer solution is not limited, but may be 1,000 cp or less, specifically 100 cp or less, and more specifically 10 cp or less at 25° C., and the range is preferred since it is easy to disperse the conductive particles described later in the range.

In a specific example, the step (b) of filling the dispersion into a plurality of holes may be performed by a method commonly used for applying a solution to form a film. As an example, it may be performed by spin coating, roll coating, spray coating, blade coating, bar coating, dip coating, and the like, and preferably by dip coating, but the present invention is not limited by a specific coating method.

In a specific example, the thickness of the polymer matrix is decreased while the width in the surface direction may be increased by tension in step (a), and the tension is removed in step (c) to increase the thickness of the polymer matrix and decrease the width in the surface direction. Thus, cells filled into the holes of the polymer matrix may form a convex portion protruding outward on the surface of the polymer matrix.

In a specific example, the step (d) of curing the dispersion may be performed by a method commonly used for curing the silicon-based elastomer. As an example, it may be performed by thermal curing at a high temperature, curing at room temperature, UV curing, ultrasonic curing, and the like, and preferably, may be cured by thermal curing at a high temperature. Here, the dispersion may be cured at 60 to 100° C., preferably 70 to 90° C. for 0.1 to 5 hours, preferably 0.3 to 2 hours. By curing within the ranges of the temperature and the time, water droplets formed inside the silicon-based elastomer may be evaporated.

In a specific example, after completing step (d) of the method for manufacturing a stretchable sensor array, (e) etching the polymer matrix may be further included.

In step (e), a solution including an ammonium fluoride-based compound and a polar aprotic solvent may be used for etching the polymer matrix.

First, an ammonium fluoride-based compound forming an etching solution serves to etch the surface of a metal film, and dissociates a fluorine ion such as F— or $HF_2$— on the organic solvent, thereby participating an etching reaction. The kind of ammonium fluoride-based compound is not particularly limited, and any compound may be used as long as it is known in the art. More specifically, it may be selected from the group consisting of ammonium fluoride (AF), ammonium butyl fluoride (ABF), tetramethylammonium fluoride (TMAF), tetrabutylammonium fluoride (TBAF), tetrabutylammonium hydrofluoride (TbAHF), and preferably may be tetrabutylammonium fluoride (TBAF).

The polar aprotic solvent may be any solvent as long as it is known in the art, and preferably an amide-based solvent, more preferably dimethylacetamide (DMAc) or dimethylformamide (DMF).

The solution may be a mixture of an ammonium fluoride-based compound and a polar aprotic solvent at a volume ratio of 1:2 to 1:5, preferably at a volume ratio of 1:2 to 1:4. When the volume ratio of the ammonium fluoride-based compound and the polar aprotic solvent is less than the range, the etching effect to a metal film is insignificant, and when the volume ratio is more than the range, the etching effect is greatly increased to damage the film and the removal of etched residues is insufficient to cause defects on the film due to the residues remaining on the surface to show an adverse effect on the characteristics of an element, and thus, the content may be limited for increasing a single-noise ratio of the sensor.

Hereinafter, the present invention will be described in detail by the examples. However, the examples are for describing the present invention in more detail, and the scope of the present invention is not limited to the following examples.

<Example> Manufacture of Stretchable Sensor Array

First, Ecoflex™ was added to a mold, which was placed in an oven and cured, and then a demolding process was performed to manufacture a polymer matrix including a plurality of holes. Simultaneously, 1 g of carbon nanotubes (CNT) dispersed in 40 g of chloroform was mixed with 24 g of polydimethylsiloxane (PDMS) to manufacture a CNT-PDMS dispersion of 4 wt % of CNT. The CNT-PDMS dispersion was dip-coated on the polymer matrix to which tension was applied to fill holes of the polymer matrix with a CNT-PDMS composite, and the tension was removed to allow the CNT-PDMS composite to have a convex shape. After curing in oven, the CNT-PDMS composite was etched with a solution in which tetra-n-butylammonium fluoride (TBAF) and dimethylformamide (DMF) were mixed at a volume ratio of 1:3 for increasing the signal-noise ratio of a sensor and dried to finally complete a sensor. The manufactured sensor had a structure in which the CNT-PDMS composite was formed in a cell form having a convex shape in the holes of the polymer matrix, and the entire sensor was easily stretched and deformed and each cell was separated, so that there was no electrical connection between cells.

<Experimental Example 1> Analysis of Structure of Tactile Sensor

Figure 3:
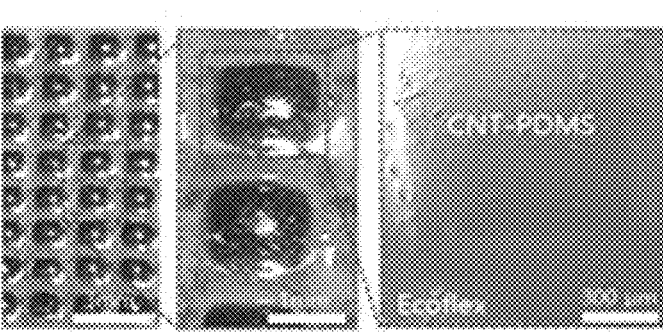
FIG. 3 is images in which the stretchable sensor array of the present invention was observed by an optical microscope and SEM.
Figure 3:
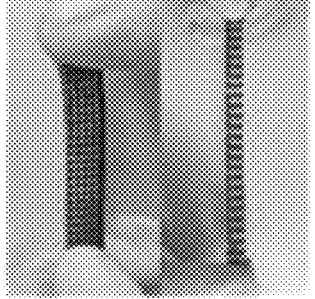

The optical image and the SEM image of the tactile sensor including the stretchable sensor array manufactured in the above example are shown in FIG. 3.

Referring to FIG. 3, it is confirmed that a plurality of cells were included on the surface of the polymer matrix, the cells including the CNT-PDMS composite were separated and formed in each pore, and the cells had a convex shape.

<Experimental Example 2> Change in Resistance Depending on Pressure of Tactile Sensor Electrodes were disposed on the upper and lower portions of the stretchable sensor array manufactured in the above example, and then pressure was applied in a vertical direction to the stretchable sensor array to measure a change in resistance.

Figure 4:
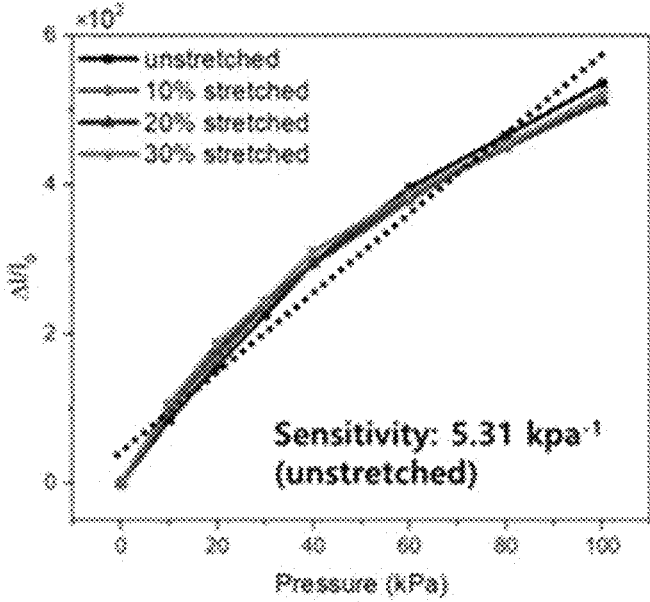
FIG. 4 is a schematic diagram showing pressure sensitivity depending on tension of the stretchable sensor array of the present invention.

Referring to FIG. 4, it was found that when tension was not applied to the manufactured tactile sensor, and when tensions of 10%, 20%, and 30% were applied and pressure was applied to the tactile sensor, a change in resistance was increased at a constant rate (about 5.31 kpa⁻¹) with increased pressure. That is, the reaction was constant regardless of the presence or absence of tension and the degree of tension. This was because even when tension was applied to the stretchable sensor array, the polymer matrix structure was mostly deformed while the CNT-PDMS composite was hardly deformed, thereby decreasing the effect of tension.

That is, in the stretchable sensor array according to the example, while maintaining the flexibility of the sensor due to the structure of the polymer matrix, the polymer matrix having a low Young's modulus was responsible for most deformation when stretching the sensor, and the CNT-PDMS composite which was a pressure-sensitive material having a relatively high Young's modulus was not deformed, so that pressure was measured without interference of tension.

<Experimental Example 3> Change in Resistance Depending on Tension of Tactile Sensor Electrodes were disposed on the upper and lower portions of the stretchable sensor array manufactured in the above example, and then tension was applied to measure a change in resistance.

Figure 5:
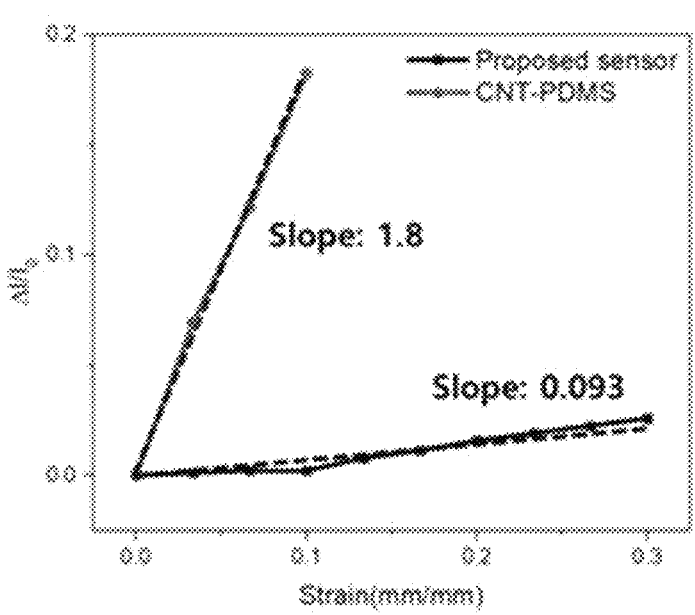
FIG. 5 is a schematic diagram showing a change in resistance depending on tension of the stretchable sensor array of the present invention.

Referring to FIG. 5, it was found that when tension was directly applied to the CNT-PDMS composite, resistance was changed with a significantly large amount of change depending on the degree of tension. However, it was confirmed that when the sensor manufactured by spacing the CNT-PDMS composite in a convex cell form in the polymer matrix structure according to the example was used, the amount of change in resistance depending on the degree of tension was significantly decreased.

That is, in the stretchable sensor array according to the example, it was found that the CNT-PDMS composite cells were separated to decrease interference by an adjacent cell when sensing a pressure distribution, and thus, the change in resistance was not large even when tension was increased, and also, the polymer matrix having a low Young's modulus was responsible for most deformation and the CNT-PDMS composite which was a pressure-sensitive material having a relatively high Young's modulus was not deformed, so that pressure was measured without interference of tension.

In conclusion, the stretchable sensor array may be manufactured easily and rapidly by the manufacturing method, and the stretchable sensor array manufactured by the manufacturing method may measure pressure without interference of tension while maintaining the flexibility of the sensor, measure pressure with high sensitivity, have a large pressure sensing range, and have decreased interference by an adjacent cell when sensing a pressure distribution.

According to the stretchable sensor array and the method for manufacturing the same of the present invention, pressure may be measured without interference of tension while maintaining flexibility of a sensor. In addition, the stretchable sensor array may have high initial resistance, induce a large change in contact resistance when pressure is applied, thereby being capable of measuring pressure with high sensitivity, have a wide pressure sensing range, and have decreased interference by an when sensing a pressure distribution.

What is claimed is:

1. A stretchable sensor array comprising:
   a polymer matrix including a first elastomer and having a plurality of holes; and
   a plurality of cells which are filled into the plurality of holes and include a convex portion protruding outward on one or more surfaces of the polymer matrix,
   wherein the polymer matrix is stretchable,
   wherein the first elastomer is silicone-based elastomer,
   wherein the plurality of cells includes a conductive composite including conductive particles and a second elastomer, and
   wherein a Young's modulus of the conductive composite is higher than a Young's modulus of the polymer matrix.

2. The stretchable sensor array of claim 1, wherein the convex portion protruding on the surface of the polymer matrix has a height of 0.1 to 1 mm.

3. The stretchable sensor array of claim 1, wherein the cells have a decreased thickness with compression.

4. The stretchable sensor array of claim 1, wherein the first elastomer and the second elastomer are a silicon-based elastomer.

5. The stretchable sensor array of claim 1, wherein the conductive particles are a conductive carbonaceous material.

6. The stretchable sensor array of claim 5, wherein the conductive carbonaceous material is a carbon nanotube.

7. The stretchable sensor array of claim 1, wherein the conductive particles are included at 0.1 to 15 wt % with respect to the conductive composite.

8. The stretchable sensor array of claim 1, wherein the stretchable sensor array senses pressure to generate an electrical signal.

9. A tactile sensor comprising:
   an upper electrode;
   the stretchable sensor array of claim 1 in electrical contact with the upper electrode; and
   a lower electrode in electrical contact with the stretchable sensor array.

10. The tactile sensor of claim 9, wherein the tactile sensor has a sensitivity $(S=(\Delta l/l_0)/\Delta p)$ of 0.8 kPa$^{-1}$ or more.

* * * * *